C. W. & F. SIEMENS.

FURNACE.

No. 3,265. Reissued Jan. 12, 1869.

Witnesses.
F. P. Hale Jr
Frederick Curtis.

Inventor.
Charles William Siemens
Friedrich Siemens
by their attorney
R. H. Eddy.

THE NORRIS PETERS CO., PHOTO-LITHO., WASHINGTON, D. C.

C. W. & F. SIEMENS.

FURNACE.

No. 3,265. Reissued Jan. 12, 1869.

Witnesses.
F. P. Hale Jr
Frederick Curtis.

Inventor.
Charles William Siemens
Friedrich Siemens
by their attorney
R. H. Eddy.

THE NORRIS PETERS CO., PHOTO-LITHO., WASHINGTON, D. C.

C. W. & F. SIEMENS.
FURNACE.
No. 3,265. Reissued Jan. 12, 1869.
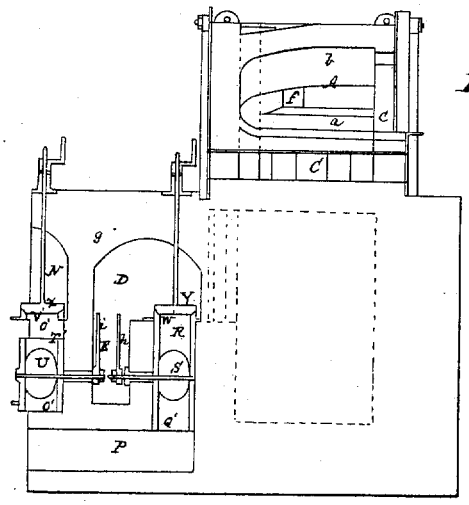
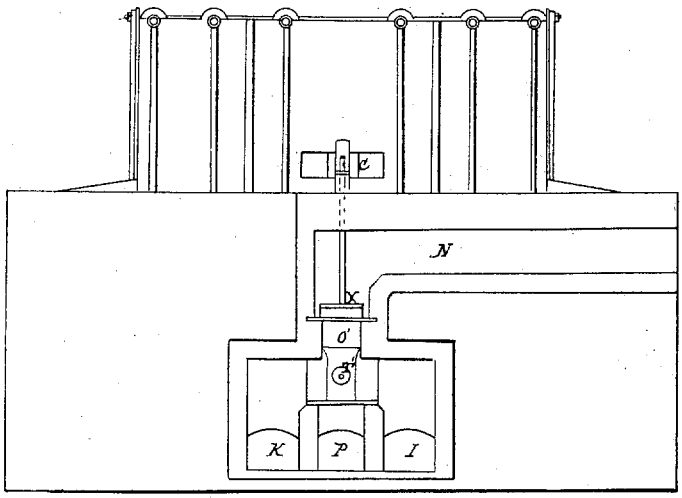
Witnesses.
F. P. Hale Jr
Frederick Curtis.
Inventor,
Charles William Siemens
Friedrich Siemens
by their attorney
R. H. Eddy.
THE NORRIS PETERS CO., PHOTO-LITHO., WASHINGTON, D. C.

C. W. & F. SIEMENS.

FURNACE.

No. 3,265. Reissued Jan. 12, 1869.

Witnesses.
F. P. Hale Jr
Frederick Curtis.

Inventor.
Charles William Siemens
Frederick Siemens
by their attorney
R. H. Eddy.

THE NORRIS PETERS CO., PHOTO-LITHO., WASHINGTON, D. C.

United States Patent Office.

CHARLES WILLIAM SIEMENS AND FREDERICK SIEMENS, OF WESTMINSTER, ENGLAND.

*Letters Patent No.* 41,788, *dated March* 1, 1864; *reissue No.* 3,265, *dated January* 12, 1869.

IMPROVED REGENERATOR-FURNACE FOR METALLURGISTS AND OTHERS.

The Schedule referred to in these Letters Patent and making part of the same.

*To all persons to whom these presents shall come:*

Be it known that we, CHARLES WILLIAM SIEMENS and FREDERICK SIEMENS, residents of Great George street, Westminster, in or near the city of London, of the Kingdom of Great Britain, have made a new and useful invention, having reference to Furnaces of various kinds; and we do hereby declare the same to be fully described in the following specification, and represented in the accompanying drawings, of which—

Figure 1 is a top view;

Figure 2, a longitudinal section;

Figure 3, a transverse section;

Figure 4, a rear elevation; and

Figure 5, a front elevation of a puddling-furnace, with our said invention applied to it.

Figure 7:
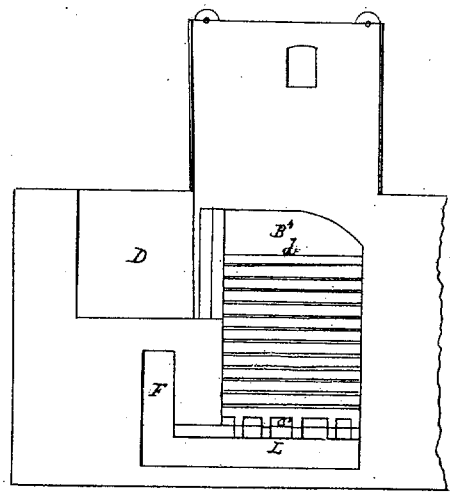
Figure 7 is a transverse section, taken through one of the outermost regenerators.

The object of our invention is not only to economize heat, or to save and utilize much of it that is generally wasted by being allowed to escape into and through the chimney of a furnace, but to produce heat by the combustion of gases and atmospheric air, in mixture, the gases being derived from coal or other fuel by a furnace such as we shall hereinafter explain, or by any other suitable means or apparatus.

In carrying out our invention in its application to a furnace for puddling iron, or for any other purpose, where the furnace is to be heated to a high degree, we arrange four of what we term the "regenerators," below the level of the bed of the furnace, and when all or any of them may be placed immediately underneath the furnace, we form underneath the latter a space for the circulation of cold air, the top of the regenerator or regenerators which may be immediately underneath such space being duly covered.

Passages lead from the upper part of two of these regenerators into the furnace, or into a channel or passage communicating with one end thereof. Similar passages lead from the two remaining regenerators, and in a similar manner communicate with the opposite end of the furnace.

The lower parts of the four regenerators have passages leading into them respectively. To one of the regenerators of each pair, at either end of the furnace, the passage leading into its lower part is to open into the atmosphere, so as to supply the regenerator with atmospheric air. The passage leading into the lower part of the other regenerator of the pair is a gas-conduit for supplying its regenerator with gas.

The several passages communicate with a flue or chimney, and have valves and reversing-dampers, by means of which currents of air and combustible gas or gases may be directed through the furnace and the whole system of regenerators in the following manner:

A current of air is to be caused to flow into the lower part, and up through one of the regenerators of one of the two pairs of them. At the same time a current of gas is to be made to flow into the lower part of the other regenerator of such pair. After ascending through their regenerators, or between the bricks of the mass of loosely-piled brick-work, or other refractory material making part of such regenerator, the said aërial and gaseous currents unite and flow into the furnace where they are to be fired.

The heated volatile products, or spent gases resulting from the combustion of the said currents of air and gas, will flow out of the furnace, and into and down through the two remaining regenerators, and, after circulating through the masses of brick-work or refractory material of which such regenerators are composed in part, the said spent products will be directed into and will escape by the chimney.

When the last two regenerators may have been sufficiently heated, the direction of the aërial and gaseous currents is to be reversed; that is to say, the currents of air and gas are to be caused to enter the two last-mentioned regenerators separately; that is to say, air is to pass into one, and gas into the other.

In ascending through the regenerators, the air and gas will be heated, or will absorb from the masses of brick-work much of the heat previously imparted to them, after which the two currents will unite and flow into the furnace, and there will be inflamed, and will produce a flame of very great intensity or heat. The spent products of combustion will flow out of the furnace, and thence down through the remaining two regenerators, and after imparting their heat to them, or having it more or less abstracted by them, will be directed into and caused to escape by the chimney. The supplying aërial and gaseous currents are thus to be thrown through the pairs of regenerators alternately, their combustible products escaping through the discharging pair, and serving to heat them, while they, in turn, serve to heat the aërial and gaseous currents, when caused to flow through them.

Figure 8:
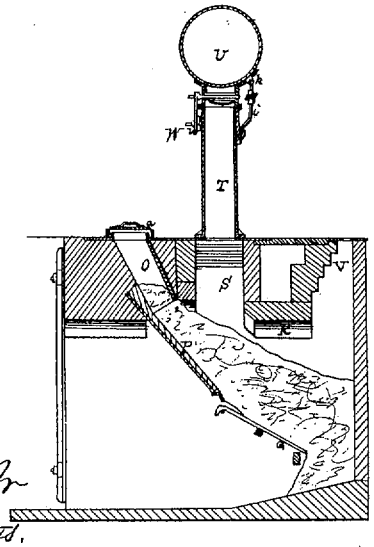
Figure 5:
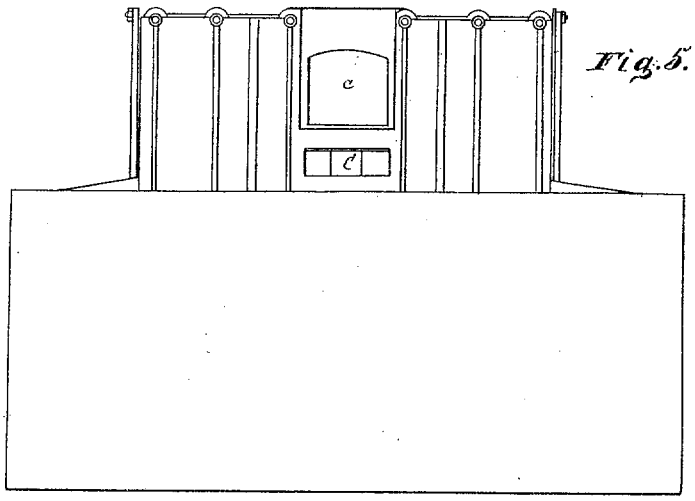
Figure 6:
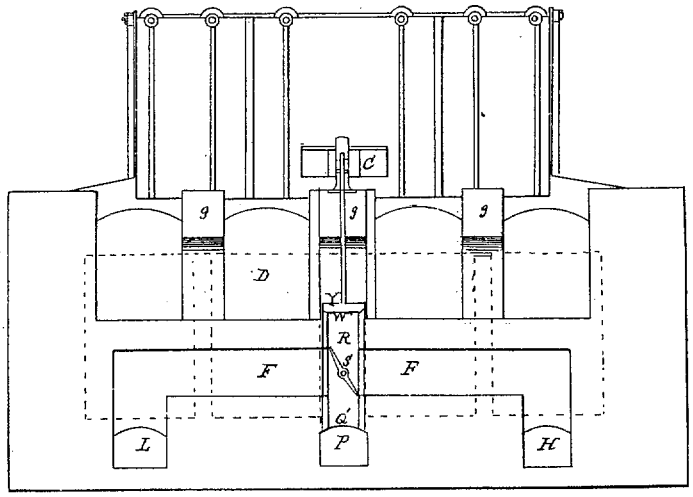
Figure 6 is a longitudinal section, taken through the air-valves and passages of the two outermost or air-regenerators, to be hereinafter described.
Figure 1:
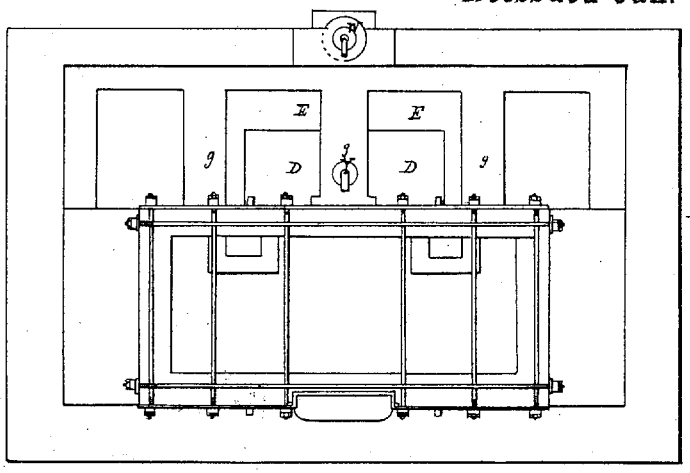
Figure 2:
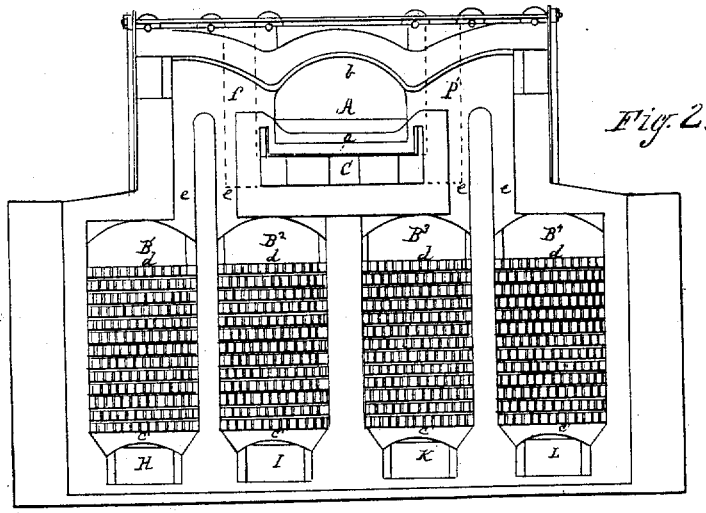

Before proceeding to more fully describe our invention, we will explain a gas-generator such as may be employed in connection therewith, the said generator being shown in vertical section in Figure 8. One or more of these generators may be used in connection with a conduit or conduits for the conveyance of gas to the regenerators.

In this gas-generator, O is a hopper or induct, into and through which the coal or fuel is to be introduced, the said hopper being closed by means of a cover, *a*, after it may have received a supply of fuel.

From the hopper the fuel descends an inclined plane,

P, composed of fire-brick, or other proper refractory or heat-resisting material, it being inclined at an angle of about forty-five degrees to the horizon. From thence the fuel passes upon a fire-grate, Q, having a less inclination.

Over this grate, but at a sufficient height from the same to allow a deep layer of fuel to intervene, there is an arch, R, of fire-brick. This arch, after having been heated to a considerable degree by the fire on the grate, will radiate heat on the fresh fuel while it may be passing down the plane P, and thus will aid in causing the decomposition and volatilization of the fuel, which will be afterwards completed by the fire in the furnace, and by the atmospheric air which may enter through the grate Q. The air, on passing through the highly-heated fuel lying upon the grate, will be decomposed into carbonic-acid gas, with a certain proportion of nitrogen. Afterward, on passing up through the thick layer of fuel in a less state of combustion or incandescence, it will become transformed into carbonic oxide, and in this state will pass over the surface of the fuel, resting on the plane P, where it will mix with the gases evolved from the same, and finally escape by the passage S, and into the vertical pipe T, leading into the conduit U, by which it will be conveyed to the regenerators.

The aperture V, at the top of the generator, is to enable a person to introduce a poker into the fuel, for the purpose of stirring it from time to time. A valve, *w*, in the pipe T, answers to close the latter as occasion may require. By means of a pipe, *k*, leading into a conductor, *i*, water may be led into the generator in a small stream. This small current of water, falling on the fuel, becomes vaporized. The vapor, acting on any hot particles of carbon rising up with the gases, will combine with the same and form two combustible gases, viz, carbonic oxide and hydrogen.

We do not confine our invention to the employment of this specific form or kind of gas-generator, as there may be others which may be employed to good advantage, the whole depending on circumstances. By means of the gas-generator, or, in other words, by decomposing the solid fuel, such as coal, lignite, peat, &c., by means of a separate apparatus, we not only avoid the introduction of such fuel into the furnace, but we are enabled to heat the gas to a high degree, and to mix it with heated air, preparatory to its being conducted into the furnace or place designed for its combustion, and to be heated thereby. By the absence of any solid carbon or ashes in the working-chamber of the furnace, operations may be carried on in an open furnace, which hitherto it has only been possible to conduct in covered vessels or pots.

Thus we can melt flint, extra white, and other superior qualities of glass in open pots, fire pottery without enclosing the same in "saggers," or melt steel and other substances upon an open bed or hearth, without injury.

It is also important, in many operations, that the state of pressure of the gases in the furnace should be under entire control, and should sometimes exceed, and at other times exactly balance that of the atmosphere, in order to prevent the egress of flame from, or the ingress of air into the furnace, on opening apertures for the approach of the workmen attending the operation to be carried on, such as blowing glass or puddling iron. For this purpose we arrange, with the furnace, four regenerators, as hereinafter described, and to operate as before specified.

In some cases, however, where no great heat may be required, or where the gas may be very rich in combustible matter, the two regenerators intended for heating the combustible gases, may be suppressed, and mere passages substituted, but we generally prefer the employment of the four regenerators.

In applying our improvements to glass-furnaces, we find it sometimes advantageous to melt the materials composing the glass, in open pots, and to cover the latter with movable lids whilst working the metal out in the usual way. When it is required to accomplish secondary operations in separate furnaces, for instance, to heat annealing-furnaces or "lears" in the manufacture of glass, we accomplish this without providing separate regenerators, but by arranging branch-channels leading from the upper portion of the four regenerators, to the lear or furnace to be heated, where they join in combustion.

Dampers, of fire-clay or other refractory material, are to be provided, in that case, to these channels, to regulate the flow of the gases, according to the direction in which the main furnace may be working, or we draw off the mixed gases, in a state of combustion, from the principal furnace.

In firing pottery-ware, in calcining ores, and other operations, it is required that the furnace charged with these materials, after having been heated to the desired degree, should cool gradually and completely before it is charged again. In such cases, we propose to provide similar furnaces, side by side, and only one set of four regenerators, which, by means of slides or valves of fire-clay, or other proper refractory material, can be made to communicate at intervals with one heated furnace or the other. During the time that one furnace is fired, the other is to be allowed to cool, to be discharged, and charged again with fresh material, and *vice versa*. The regenerators may thus always be kept in working-condition. Or we arrange four or more chambers, in such way that they themselves may contain the materials to be fired, and serve alternately as regenerators, and as kilns to be fired or discharged.

In the drawings, figs. 1, 2, 3, 4, 5, 6, and 7—

A is the furnace, of which *a* is the bed, and *b*, the crown or arch, and *c*, the mouth.

Beneath the bed of the furnace are the four regenerators, $B^1$ $B^2$ $B^3$ $B^4$, each consisting, in part, of a chamber, erected of fire-brick or other suitable material, and having a grating, *c'*, extending across its lower part, and constituting part of the upper portion of an arched passage, H, I, K, or L, arranged underneath such chamber.

Upon this grating is a pile, *d*, of fire-bricks, or other heat-absorbing and indestructible materials, the same being arranged or stacked in such manner as to leave interstices or spaces between them, so as to enable the air or gas, while passing through the pile, to come in contact with the surfaces of the several parts or bricks thereof.

Each of the said regenerators is arched or closed over at its top, and opens into the furnace by a passage, *e*, leading out of it, and into a common passage, *f* or *f'*, as shown in the drawings.

The two passages *f f'* lead out of the furnace A in opposite directions, and from opposite ends thereof.

Directly underneath the bed of the furnace A, and between it and the tops of the two inner regenerators $B^2$ and $B^3$, there is an air-chamber or space, C, which should communicate freely, at its opposite sides or ends, with the atmosphere, in order that a current of cool air may be caused to continually pass through it, for the purpose of maintaining the bed of the furnace, as well as the arches of the regenerators $B^2$ $B^3$, at a low temperature, and thus protect them from being destroyed by the intense heat within the furnace and regenerators, while they may be in operation.

In rear of the upper parts of the regenerators, and below the furnace, there is an air-space or chamber, D, which, at intervals, is bridged, as shown at *g g g*.

There is, also, below the space D, a sunken space or chamber, E, in which are situated the levers for working the dampers of the apparatus.

In front of the space E, there is a passage, F, (see fig. 6,) which continues horizontally in opposite directions, and thence drops downward, and, at its two extremities, opens respectively into the two passages H and L, which extend underneath the two outermost regenerators.

Each of these passages H I K L is to be closed at both of its ends, but the two middle passages I K are shown, in fig. 4, as open at their rear ends.

These middle passages, however, with vertical continuations of them leading into a horizontal passage, N, are, as well as the said passage N, to be walled up or covered in rear. The same may be said with respect to a gas-tube or passage, O′, which is to lead from the generator and into the passage N, as shown in figs. 3 and 4.

Between the two passages I K, there is a smoke-flue, P, into the rear part of which there is an opening, Q′, leading from the passage F, or a damper-case, R, arranged vertically therein, and having a damper, S′, arranged within it, and so as to be capable of being turned by a lever, *h*.

There is another such damper-case, T′, applied in the passage N, and opening, at its opposite sides, into such passage, and also, at its top, into the generator-conduit, or gas-flue, O′.

Within the case T′, there is a damper, U, capable of being turned by a lever, *i*.

Situated over each of the damper-cases, there is a valve-opening, V′ or W′, provided with a valve, X or Y, the whole being arranged as shown in figs. 3 and 4.

By means of the damper U, gas from the passage O′ may be led into either of the passages I K, it being cut off from passing into one while it may be passing into the other. So, by means of the damper S′, air may be caused to flow *ad libitum* into either of the passages H L, it being cut off from one while it may be passing into the other.

The valve Y will serve to arrest the flowage of air into the passage F. So with the valve X; it will answer to close off the passage of gas into the damper-case immediately underneath it.

The operation of the said apparatus having been hereinbefore substantially described, we now proceed to point out what we claim as our invention; that is to say—

We claim, in combination with a furnace, A, and its chimney or smoke-discharge flue P, a system or series of air and gas-regenerators, $B^1$ $B^2$ $B^3$ $B^4$, constructed substantially as specified, and having conduits and dampers, arranged so that air and gas may be led into and through such regenerators and furnace, and out of the chimney, in manner and so as to be operated as and for the purpose or purposes hereinbefore described.

We also claim the arrangement and combination of the air-space or open chamber C, with the furnace and its system of regenerators, arranged and applied together substantially in manner and so as to operate as described.

We also claim the arrangement and combination of the air-chamber or space D, or the same and the space E, with the furnace, regenerators, conduits, and damper-chests applied thereto, the whole being substantially as specified.

We also claim the combination of a furnace with one or more regenerators or means of receiving its waste smoke and gaseous products, and intercepting or receiving heat therefrom, and also with means or devices by which all or a portion of the heat so intercepted or received may be absorbed by the influent air or gas during its passage into or to such furnace, for the purpose of improving or promoting combustion therein.

C. W. SIEMENS.
FRED. SIEMENS.

Witnesses as to C. W. SIEMENS:
EDW'D N. HOBBS,
THOS. TANNER,
*Both of 2 Pope's-Head Alley, Cornhill, London, Gentlemen.*

Witnesses as to FREDERICK SIEMENS:
OSWALD ROETHIG,
PAUL DRUCKMÜLLER,
*Of Dresden.*